Patented Nov. 1, 1938

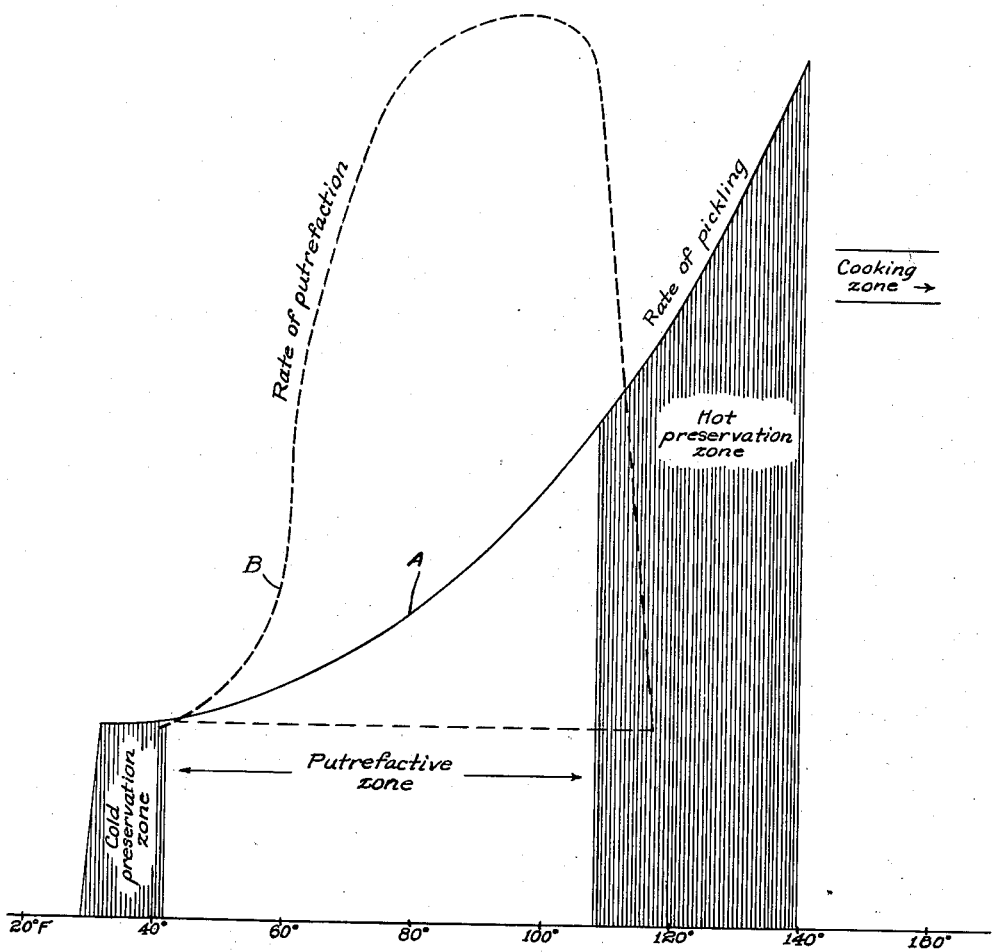

2,135,334

UNITED STATES PATENT OFFICE 2,135,334

PROCESS OF AGING AND PICKLING MEAT AND THE LIKE

Charles C. Guthrie and William S. McElroy, Pittsburgh, Pa.

Application January 30, 1937, Serial No. 123,235

3 Claims. (Cl. 99—107)

Our present invention relates to the preserving, pickling and curing of meat and other products of animal origin and is more particularly concerned with hot preserving, pickling and curing operations for the purpose of preventing spoilage and putrefaction as well as with the products thereby produced.

It has been customary for a long time in this art to preserve meat and the like by refrigeration and/or cold pickling operations. It has been known, however, that such cold procedures are not entirely satisfactory in that meat and other products which have been so treated are susceptible to spoilage when subsequently subjected to higher temperatures unless adequate pickling is ensured. The action of the cold alone merely renders the products bacteriostatic, i. e., growth and multiplication of bacteria and other microorganisms are restrained but at higher temperatures growth and multiplication immediately again rapidly proceed. It is also known that these cold procedures have a retarding effect both upon the pickling action and upon the development of the desired properties and characteristics in the meat. While the industry has perforce accepted the cold treatments, it has sought some other treatment which would produce superior results in a shorter period of time. While there have been certain proposals made in this art, as will be hereinafter pointed out more in detail, the industry has not yet developed either the treatment or the results which it seeks.

One of the objects of our present invention is to produce preserving, pickling and curing operations which will not only be vastly superior and more efficient to the present cold procedures but which will greatly reduce the period of time necessary for the production of finished products.

Another object of our invention resides in the discovery that hot preserving, pickling and curing operations can be so carried out as to actually kill or destroy bacteria and other microorganisms generally found in or upon the meat and other animal products while at the same time producing products of new and improved qualities in a very much reduced period of time.

A still further object of our invention resides in carrying out pickling, preserving and curing operations upon meat and allied products at a temperature which is incompatible with bacterial life and growth but which is distinct from a cooking operation.

A still further object of our invention resides in the hot preserving, pickling and curing of meat, poultry, game and fish without refrigeration or cooking by subjecting the same for a suitable period to a temperature within the range of approximately 110 to 140° F., thereby preventing spoilage while at the same time greatly accelerating the preserving, pickling and curing and other desirable changes in these materials.

Other and further objects and advantages will either be understood by those skilled in this art or will be apparent or pointed out hereinafter.

In the accompanying drawing we have graphically represented the principles upon which our present invention is based.

Cold zone procedure

In the preserving, pickling and curing of meat and the like as hitherto practiced over a long period of time, it has been customary to subject meat, for example, immediately after the slaughtering of an animal, to a refrigerating temperature which is in the neighborhood of 38° F. but which may vary a few degrees either way therefrom. The purpose of the reduced temperature is to retard putrefaction and other deleterious post-mortem changes in the animal and to apply preserving substances, such as salt, which itself tends to prevent such changes. These two procedures are carried out either separately, i. e., consecutively or simultaneously. The action of low temperature alone is primarily a restraint of bacterial growth producing a bacteriostatic condition and there is substantially no killing or destruction of bacteria or other micro-organisms. Consequently, when such products are thereafter subjected to higher temperatures (up to about 105-110° F.), they rapidly spoil and become unfit for human consumption due to the fact that bacterial growth proceeds rapidly. The action of salt or other preserving substances is substantially similar to the action of the cold itself but used together the two supplement each other in restraining bacterial and retarding other undesirable changes. There is this distinction, however, that if the preserving substances are present in adequate concentration and under such conditions as to effect adequate permeation of the material subsequent spoilage is much reduced, even where higher temperatures are encountered. There is apparently some reaction between the preserving substance and the meat whereby the composition or character of the meat is so altered as to reduce the liability to spoilage. This is termed pickling or curing.

Such cold procedures generally require a long period of time before any material effect is produced. The time required in any given instance depends upon a number of factors such as the character of the material, its thickness and composition, the concentration of the pickle or preserving substance and the method of its application. For example, regular hams require anywhere from 40 to 60 days of soaking in the conventional cold pickle at a temperature usually below 40° F. At this temperature the pickling or curing action is very materially retarded, we have found, and this at least in part accounts for the long period of time—usually a matter of months—for the cold treatment.

Proposals have been made which will somewhat decrease this period of time and these proposals do in fact offer certain advantages over the conventional procedure as above outlined. By intra-muscular injection of pickle or pickling solutions the time for cold treatment can be somewhat reduced and the percentage of spoilage somewhat decreased. This in itself is subject to disadvantages which are known to those skilled in this art. Permeation of pickle or preservative is still apt to be non-uniform particularly as to bone and marrow and those portions contiguous to the bones and joints. By deboning hams and the like and inserting spreaders the soaking or pickling then can be reduced to 15 days or less and spoilage substantially eliminated. This procedure offers definite advantages and is fully set forth and claimed in our co-pending application Serial No. 123,234, filed January 30, 1937. By the capillary introduction of pickle or preservative and controlling the pickling or preserving action by utilizing the arteries and veins of the carcass immediately after slaughtering, further advantageous results can be secured as set forth and claimed in our co-pending application Serial No. 1,894, filed January 15, 1935. In this procedure all the minutest portions of the tissues and tissue substances including the bone and bone marrow are rapidly and completely permeated, even without refrigeration and regardless of temperature and humidity conditions at the time and place of carrying out the procedure.

Thus generally speaking, the present cold procedures are intended to prevent spoilage by subjecting the materials to low temperatures in the neighborhood of 38° F. until the pickle or preservative has time to permeate and exert its pickling or curing action. Since temperatures which are low enough to produce the preservative and anti-putrefactive action enormously retard the very actions which are sought to be produced, a long period of time is required under these conditions. Such proposals we will hereinafter refer to as procedures carried out within the cold preservation zone which is to be understood as covering temperatures in the neighborhood of 32 to 42° F. (see accompanying graph), and more generally temperatures below 50° F. This of course does not apply to the procedure referred to as forming the basis of our copending application Serial No. 1,894, which does not depend upon the necessity of any particular temperature conditions.

*Hot zone procedure*

In contrast with the foregoing, we have discovered that much more effective and rapid preserving, pickling and curing operations can be carried out within a new temperature zone which we hereinafter refer to as the hot preservation zone. As we pointed out above, after the cold zone treatments, the substances rapidly spoil unless adequately cured when subjected to temperatures within which bacterial growth and multiplication are again permitted or accelerated. This will be better understood by referring to the accompanying drawing. On that drawing curve A represents the rate of pickling in accordance with varying temperature and curve B represents the rate of putrefaction over a similar range of temperature. As the temperature rises above approximately 42 F., the rate of putrefaction increases rapidly until at about 100° F. maximum rate of putrefaction is encountered. Above approximately 100° F. the rate of putrefaction begins to fall off and then falls off rapidly until at approximately 120 F. the rate of putrefaction is practically zero. Within the cold preservation zone the rate of putrefaction is lowered but only a bacteriostatic condition is produced. That is to say, within the cold preservation zone the growth and multiplication of bacteria or other micro-organisms are retarded or restrained but the bacteria and micro-organisms are still alive with substantially unimpaired growing and multiplying powers. In direct contrast with this, at about 120° F. and throughout the whole range of the hot preserving zone, a germicidal effect is produced, resulting in substantially entirely killing and destroying bacteria and other micro-organisms while at the same time rapidly accelerating pickling action and other desired changes, as will be hereinafter more fully understood.

The basis of our invention thus is the discovery that there is a new zone within which new and useful results can be secured in preserving and curing procedures. We have found that this zone cannot be precisely expressed in exact units, i. e., degrees of temperature, but we can define the hot preservation zone as that zone, the lower limit of which is incompatible with putrefactive or other spoilage changes and the upper limit of which is below the cooking temperature of the particular substance. As shown on the drawing, the hot preservation zone is indicated as extending from approximately 110° F. to 140° F. but in setting forth this range of temperature we wish to repeat that while it is approximately correct, the zone cannot be exactly expressed in degrees of temperature due to the variations in the materials and conditions or the thermal death points of the bacteria and other micro-organisms which may be encountered. However, the hot preservation zone includes temperatures which are equivalent to the thermal death points of at least the majority of the common bacteria and micro-organisms which are ordinarily present. We also point out in connection with the drawing and our hot preserving treatment that the rate of pickling is accelerated at temperatures between about 110° F. and 140° F., and this can be readily determined by a reference to curve A which indicates that within this temperature range the rate of pickling is not only rapid but is increasing at a rapid rate.

As we have also indicated above, our treatment within the hot preservation zone is not and must be kept distinct from a cooking operation and while cooking temperatures may vary in accordance with the particular material to be cooked and the degree or extent of cooking to be produced, nevertheless we have found that cooking in the ordinary accepted sense of the term commences at approximately 145° F. If cooking be considered in terms of protein coagulation, for example, such coagulation becomes definite and marked around 145° F.; there may be some minor or gradual coagulation below 145° F. While the cooking temperature varies, as already pointed out, for different materials, our procedure produces raw preserved, pickled and cured products as distinct from cooked products. Cooking may, of course, be subsequently resorted to if cooked finished products are to be produced.

Treatment in the hot preservation zone in accordance with our present invention not only bring about effective spoilage prevention but when used in conjunction with pickling or other curing or smoking procedures not only accelerates such pickling, curing or smoking but brings about desired physical and chemical changes in the meat or other material in a very greatly reduced period of time.

Where our procedure within the hot preservation zone is used without pickling, curing or other auxiliary procedures, we effectively prevent spoilage due to the restraint of growth and germicidal effect produced upon the bacteria and other microorganisms which may be present. We also effect desirable chemical and physical changes in the material so treated. No special humidity control is necessary as we may operate under ordinary atmospheric conditions. Thus we eliminate special dehumidification as resorted to by the prior art.

Where our present procedure is utilized in conjunction with pickling, curing or other procedures, these procedures are carried out within the temperature zone or range above set forth. In the case of pickling, for example, either the pickling solutions are heated to the specified temperature or such temperature is produced in any other suitable manner. The hot preserving and pickling procedures not only eliminate spoilage but effect the pickling and preservative action in a small fraction of the time which is required or prior procedures reducing this from weeks and months to a matter of hours or a few days. For example, whereas under cold procedures a distinct ham flavor or odor takes about two weeks to develop, this occurs in a matter of hours or a very few days under our new procedure. At the same time superior products are produced, evidenced by effects such as superior coloration and uniformity of color distribution and fixation; also, desired gustatory qualities such as odor, taste, tenderness and palatability are enhanced and the so-called "ripening" of the meat or other product is greatly accelerated so that in a relatively short period of time products are produced which are far superior to those produced in the 40 to 60 day cold treatments in appearance and texture of external and sliced surfaces, uniformity of moisture distribution, excellence of slicing qualities, etc.

Our procedure within the hot preservation zone can thus not only be carried out as a hot treatment alone but as a hot treatment in conjunction with pickling and smoking procedures and in all cases not only actually kills or destroys bacteria and other micro-organisms but accelerates the desired procedures, conditions and physical changes. —For example, when a smokehouse finish or cooked product is desired the products may be transferred thereto while still hot, thus making the procedures continuous which is frequently advantageous. In connection with hot pickling, for example, we point out that milder products, i. e., less salty or less highly seasoned products, can be produced because lower concentrations of pickling, preserving or curing materials which are adequate for complete pickling but inadequate to prevent putrefactive changes can be employed. Our present invention applies not only to hams but to the production of other raw or uncooked meat and meat products such as bacon, sausage, etc., and also to poultry, fish and game as above indicated.

We may utilize many different means for producing the desired temperature at the time when and location where such temperature is desired in accordance with the foregoing principles. We have already explained that aqueous pickling baths raised to the proper temperature may be utilized but we may also utilize other liquid baths containing fats, oils or other suitable substances. The temperature may also be produced by contact with suitable solid materials, such as metal casings or containers raised to and maintained at the desired temperature. The temperature may also be produced by contact with gases or vapors or combinations or mixtures of the same raised to and maintained at the desired temperature. Thus, the desired temperature may be established and maintained by utilizing known physical principles for heat transfer including conduction, convection or radiation or by using electrical heat transfer media resulting in transmission or induction of heat by means of electricity and specifically by high frequency emanations or waves.

The time function of our invention necessarily varies according to the product being treated and the results to be produced. In one instance a ten-hour treatment in the hot preservative zone was sufficient to produce a ham of the desired characteristics. In another case twenty hours plus or minus two to four hours at about 135° F. gave exceptionally good results in connection with another ham. Sausage (bologna) has been treated for twelve and twenty-four hours within the hot preservation zone, producing new and unusual qualities as to color, taste and keeping characteristics in which connection green discoloration as is so common with these products was restrained.

Having thus described our invention, what we claim as new and desire to secure by Letters Patent is:

1. A method of hot aging meat or other substance of animal origin which comprises subjecting the same to a temperature between about 110° F. and 140° F. under undehumidified conditions and maintaining the same at such temperature for a length of time adequate to develop desired physical, chemical and gustatory qualities therein.

2. A method of pickling and aging meat or other substance of animal origin which comprises heating a pickling solution to a temperature between about 110° F. and 140° F. and immersing the meat or other substance in said pickling solution for a period of time adequate to develop desired physical, chemical and gustatory qualities therein, whereby pickling is effected in a reduced period of time as compared with conventional pickling at low temperature.

3. A method of pickling and aging meat or other product of animal origin which comprises introducing adequate quantities of pickling substances into said meat or other product and elevating it to and maintaining it at a temperature within the range of about 110°–140° F. for a sufficient length of time to develop desired physical, chemical and gustatory qualities therein.

CHARLES C. GUTHRIE.
WILLIAM S. McELLROY.